United States Patent Office 3,332,732
Patented July 25, 1967

3,332,732
METHOD OF DYEING POLYOLEFIN FIBERS
Gabriel Karoly, Elizabeth, N.J., assignor to Esso Research and Engineering Company, a corporation of Delaware
No Drawing. Filed June 5, 1963, Ser. No. 285,593
6 Claims. (Cl. 8—42)

This invention relates to a process for treating alpha-olefin polymers to render them dyeable.

Poly alpha-olefin polymers have found increasing interest as textile materials because of their desirable properties of strength and low cost. One of the more difficult problems encountered, however, has been the poor dye acceptance of such fibers because of the inertness of a hydrocarbon polymer. Although a poly alpha-olefin material, such as polypropylene, can be dyed, its fastness to typical textile environments has been inadequate.

It has now been found that the receptivity of alpha-olefin polymers to dyeing may be improved by blending the polymer with 0.05 to 5 weight percent, preferably 0.1 to 1.0 weight percent of a selected nickel-organic compound; spinning the blend into fibers; and then contacting these fibers with a chelatable dye. When the polymer is treated in this manner, not only is the dye uptake improved, but more importantly, the resistance of the dyed product to light, washing, and dry cleaning is also improved.

While this invention is principally directed to the dyeing of fibers or filaments, it may also be used to dye poly alpha-olefin films, foils, and other similarly formed products.

The polymers treated by the process of the invention are high molecular weight alpha-olefin homopolymers and copolymers. The alpha-olefin homopolymer can be prepared by any known process, such as the so-called Ziegler process, see for example Belgian Patent 533,362 and Belgian Patent 538,782. Examples of homopolymers within the scope of the invention include polyethylene, polypropylene, poly 1-butene, and poly 1-heptene. Polymers or copolymers of branched chain alpha olefins where the branching occurs no closer than the third carbon atom can also be employed such as poly 4-methyl-1-pentene and poly 3-methyl-1-butene. In general, the homopolymers are prepared from alpha olefins having from 2 to 12 carbon atoms. The copolymers employed in the process of the invention include copolymers of two different alpha olefins such as ethylenepropylene copolymers, ethylene-1-hexene copolymers, and alpha-olefin-aromatic olefin copolymers containing from 1 to 15% by weight of an aromatic olefin, such as for example copolymers of styrene and 4-methyl-1-pentene. Also, blends of one or more of the previously mentioned polymers can be employed. The polymers and copolymers employed in the invention have viscosity average molecular weights ranging from 100,000 to 1,000,000. The preferred polymers and copolymers of the invention are those prepared by the use of alkyl metal catalysts. Most preferred is polypropylene. Catalysts which are useful in this process are mixtures of reducible heavy transition metal compounds and reducing metal containing substances, or mixtures of partially reduced heavy transition metal compounds and organo-metallic activators. Examples of these catalysts are $TiCl_4 + AlEt_3$ and $TiCl_3 + AlEt_3$. The catalysts used for preparing the preferred polymers employed in the instant process are those catalysts given on page 6, line 20 to page 10, line 21 of application Ser. No. 831,210, now abandoned, filed Aug. 3, 1959.

The nickel organic compound of this invention is specifically 2,2'-thio bis (4-t.-octyl phenol) n-butylamine nickel (II). This material is produced under the tradename of "U.V. 1084."

The requirements of nickel organic compounds for use in improving the dyeability of polyolefin fibers are twofold. First, they must be capable of chelating with dyes. Second, the material must not adversely affect the spinning characteristics of the polyolefin composition. Since spinning is accomplished under severe temperature and pressure conditions, many compositions cannot survive the process without degrading, and prove to be completely unsuitable for the production of fibers in polyolefin blends. Thus, many nickel compounds are not useful in the present invention, because they fail to fulfill either or both of the above requirements. The data below include some examples of these inoperative compounds.

The dyes which are useful in this invention are chelatable dyes. These include the "National Polypropylene" series of dyes. Examples of these are Violet 3BR, Green B, Brilliant Blue B and Brilliant Orange R. Also useful are ortho hydroxy azo dyes generally. These dyes include mono-azo dyes, conjugated di and multi-azo dyes as well as azo-pyrazolone o,o'-dihydroxy azo and o-hydroxy-o-carboxy azo type dyes. Examples of these are Orasol Yellow 3G (Solvent Yellow 17) C.I. 12770, Sudan Orange RRA (Solvent Orange #7) C.I. 12140, Sudan Red 4BA (Oil Red #24), and Oil Red O (Solvent Red #27) C.I. 26125.

The blend of polymer and nickel organic compound is melt spun or extruded into fibers or films and then contacted with the aqueous dye bath. In general, the dye bath contains from 0.5 to 5 weight percent of dye based on the weight of the material to be dyed. Where the dyes are not water soluble, it is necessary to form a dispersion before adding water. This may be done by various conventional methods. For example a 50% aqueous methanol solution may be used to disperse the dye. Alternatively, a paste may be formed with a standard dispersant such as Igepal (ethylene oxide adduct of a phenol) to which water is subsequently added. The temperature of dyeing and the time of immersion depend on the proportion of the nickel compound in the blend, the particular polymer employed, the concentration of dye employed, and the intensity of color desired. These parameters can easily be determined by routine experimentation. The temperature of dyeing is not critical and can range from 25 to 120° C. although the dye bath is usually maintained at the boiling point. The dyeing can be carried out both in the presence or absence of organic or mineral acids.

This invention will be more fully understood by reference to the following examples.

Example 1

Polypropylene fibers were prepared as follows: A polypropylene polymer was formed by passing propylene into a dispersion containing $Al(Et)_3$ and $TiCl_3$ in a benzene diluent at a temperature of 80° C.

A crystalline polypropylene resulted having a melt index of 20 and an intrinsic viscosity (in tetralin at 120° C.) of 2.5. This polymer was spun into fibers by methods known in the art (see Example 2).

When these fibers were contacted with chelatable dyes (National Aniline Green B, and Orasol Yellow 3G [Solvent Yellow 17]) very little dye pickup was observed and this light dyeing exhibited no fastness to washing or dry cleaning.

Example 2

Dyeable polypropylene fibers were prepared as follows: One gram of 2,2' thio bis (4-t.-octyl phenol) n-butylamine nickel (II) was blended with 199 g. of stabilized polypropylene powder in a Waring Blendor. This blend was spun into fibers in a batch spinning unit manufactured by the Chemtex company. The fiber spinning was accomplished under the following conditions:

Temperature, ° F.:
- Top _____ 430
- Middle _____ 560
- Bottom _____ 570

Pressure _____ p.s.i.g__ 650
Take up speed _____ ft./min__ 195

The fibers were drawn at 220° F. with a draw ratio of 4:1. They had 5.9 g.p.d. tenacity and 30% elongation. A skein of the drawn fibers was then dyed with National Aniline Green B. The dyeing was carried out for 1 hour at 95° C. The dye bath contained 1 g./l. dye, 0.5 g./l. Igepal and 10 cc. concentrated acetic acid. The dyed fibers were tested for wash, dry cleaning and light fastness according to the AATCC specifications after a scouring operation. Essentially no loss of dyestuff was observed during the washing and dry cleaning operation. The fibers showed no break after 60 hours of exposure in a Fadeometer. Similar results were achieved with other National Aniline Polypropylene dyes.

Example 3

One gram of nickel bis (thio bis [4-t.-octyl phenol]) was blended with 199 g. of stabilized polypropylene powder in a Waring Blendor. This blend was then spun in a batch spinning unit manufactured by the Chemtex company. The conditions were as follows:

Temperature, ° F.:
- Top _____ 430
- Middle _____ 560
- Bottom _____ 570

Pressure _____ p.s.i.g__ 1150
Take up speed _____ ft./min__ 95

The fibers were drawn at 220° F. with a draw ratio of 3.7:1. The quality of fibers obtained was extremely poor. They showed excessive breakage due to presence of bubbles which were formed by the decomposition of the nickel additive. The take up speed as shown above was necessarily slow since the fibers constantly broke at higher speeds.

Thus it is here shown that a nickel-containing compound which is similar to that used in this invention was unsuitable since it produced unsatisfactory fibers in the spinning unit.

Example 4

Stabilized polypropylene powder (199.6 g.) was blended with 0.4 g. of nickel carbonate in a Waring Blendor. This blend was spun in a batch spinning unit manufactured by the Chemtex company. The fiber spinning conditions were as follows:

Temperature, ° F.:
- Top _____ 430
- Middle _____ 560
- Bottom _____ 570

Pressure _____ p.s.i.g__ 1050
Take up speed _____ ft./min__ 130

The fibers were drawn at 220° F. with a draw ratio of 210/50. Good quality (over 5 g.p.d. tenacity) fibers were obtained but they showed essentially no affinity toward the National Aniline Polypropylene dyes, when applied under the conditions outlined in Example 2. Their dyeability with other ortho hydroxy azo dyes was not better than that of the nickel-free polypropylene fibers of Example 1.

Example 5

Nickel oxalate (1 gram per 199 grams of polypropylene) was used in this example in the same manner as nickel carbonate was used in the previous example. Good quality but undyeable fibers were obtained.

This invention has been described in connection with certain specific embodiments thereof; however, it should be understood that these are by way of example rather than by way of limitation, and it is not intended that the invention be restricted thereby.

What is claimed is:
1. A process for dyeing a poly alpha-olefin fiber comprising the steps of:
   (a) blending said poly alpha-olefin with .05 to 5 wt. percent of 2,2' thio bis (4-t.-octyl phenol) n-butylamine nickel (II),
   (b) forming fibers from said blend,
   (c) contacting said fibers with a chelatable dye.
2. The process of claim 1 wherein 0.1 to 1.0 wt. percent of 2,2' thio bis (4-t.-octyl phenol) n-butylamine nickel (II) is used.
3. The process of claim 2 wherein the poly alpha-olefin is polypropylene.
4. The process of claim 1 wherein the dye is an ortho hydroxy azo dye.
5. The process of claim 3 wherein the dye is an ortho hydroxy azo dye.
6. The dyed fiber of claim 5.

References Cited
UNITED STATES PATENTS
| | | | |
|---|---|---|---|
| 2,691,647 | 10/1954 | Field et al. | 260—94.9 |
| 2,971,940 | 2/1961 | Fuchsman et al. | 260—45.75 |
| 2,984,634 | 5/1961 | Caldwell et al. | 8—55 |
| 3,006,885 | 10/1961 | Dickson | 260—45.75 |
| 3,023,072 | 2/1962 | Dabrowski | 8—55 |

FOREIGN PATENTS
| | | |
|---|---|---|
| 810,023 | 3/1959 | Great Britain. |
| 849,181 | 9/1960 | Great Britain. |
| 851,611 | 10/1960 | Great Britain. |

NORMAN G. TORCHIN, *Primary Examiner.*

J. HERBERT, D. LEVY, *Assistant Examiners.*